(12) United States Patent
Xu et al.

(10) Patent No.: US 9,058,421 B2
(45) Date of Patent: Jun. 16, 2015

(54) TRACE CORRELATION FOR PROFILING SUBROUTINES

(75) Inventors: Zheng Xu, Austin, TX (US); Richard G. Collins, Austin, TX (US); Jason T. Nearing, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1153 days.

(21) Appl. No.: 12/485,196

(22) Filed: Jun. 16, 2009

(65) Prior Publication Data

US 2010/0318972 A1    Dec. 16, 2010

(51) Int. Cl.
G06F 9/44    (2006.01)
G06F 11/36   (2006.01)
G06F 9/38    (2006.01)

(52) U.S. Cl.
CPC .......... *G06F 11/3636* (2013.01); *G06F 9/3808* (2013.01)

(58) Field of Classification Search
CPC ............ G06F 11/3466; G06F 11/3471; G06F 11/3476; G06F 11/3636
USPC ............. 717/101–178; 714/28, 30, 37, 38.11, 714/45; 712/209, 227; 703/26; 711/206, 711/213; 718/102
See application file for complete search history.

(56) References Cited

U.S. PATENT DOCUMENTS

| | | | | |
|---|---|---|---|---|
| 5,355,487 A * | 10/1994 | Keller et al. | ................... | 717/127 |
| 5,630,102 A * | 5/1997 | Johnson et al. | ................... | 703/28 |
| 6,126,328 A * | 10/2000 | Mallory et al. | ............... | 717/114 |
| 6,145,122 A * | 11/2000 | Miller et al. | ................... | 717/129 |
| 6,253,338 B1 * | 6/2001 | Smolders | .......................... | 714/45 |
| 6,684,348 B1 * | 1/2004 | Edwards et al. | ................. | 714/45 |
| 6,751,789 B1 * | 6/2004 | Berry et al. | .................... | 717/130 |
| 6,754,890 B1 * | 6/2004 | Berry et al. | .................... | 717/128 |
| 6,769,076 B1 * | 7/2004 | Moyer et al. | ..................... | 714/30 |
| 6,941,545 B1 * | 9/2005 | Reese et al. | .................... | 717/130 |
| 6,988,263 B1 * | 1/2006 | Hussain et al. | ................ | 717/128 |
| 7,047,394 B1 * | 5/2006 | Van Dyke et al. | ............. | 712/209 |
| 7,093,234 B2 * | 8/2006 | Hibbeler et al. | .............. | 717/124 |
| 7,111,290 B1 * | 9/2006 | Yates et al. | ..................... | 717/158 |
| 7,137,110 B1 * | 11/2006 | Reese et al. | .................... | 717/158 |

(Continued)

OTHER PUBLICATIONS

Subramanya Sastry, S.; Bodik, R.; Smith, J.E.; , "Rapid profiling via stratified sampling," Computer Architecture, Aug. 7, 2001. Proceedings. 28th Annual International Symposium.*

(Continued)

*Primary Examiner* — Lewis A Bullock, Jr.
*Assistant Examiner* — Francisco Aponte
(74) *Attorney, Agent, or Firm* — Yudell Isidore PLLC

(57) ABSTRACT

In one or more embodiments, a data processing system can include at least one core capable of executing instructions of an instruction set architecture and a trace unit coupled to the at least one core. A call to a subroutine can be detected, and in response, a program trace correlation (PTC) message can be generated and sent to a trace port. Data associated with an execution of the subroutine and/or performance of the data processing system can be sampled and sent to the trace port. A return from the subroutine can be detected, and in response, a trace message can be generated and sent to the trace port. The PTC message and the trace message can be correlated, and the correlation of the PTC message and the trace message can be used to determine a boundary for the subroutine and/or the sampled data associated with the execution of the subroutine.

17 Claims, 4 Drawing Sheets

(56) References Cited

U.S. PATENT DOCUMENTS

| | | | |
|---|---|---|---|
| 7,249,288 B2* | 7/2007 | Peled et al. | 714/47.1 |
| 7,281,162 B2* | 10/2007 | McDonald-Maier et al. | 714/30 |
| 7,707,459 B2* | 4/2010 | Glotzbach et al. | 714/38.11 |
| 7,725,298 B2* | 5/2010 | Levine et al. | 702/187 |
| 7,865,879 B1* | 1/2011 | Kommrusch et al. | 717/124 |
| 7,958,401 B2* | 6/2011 | Moyer | 714/49 |
| 7,962,798 B2* | 6/2011 | Locasto et al. | 714/38.1 |
| 7,987,453 B2* | 7/2011 | DeWitt et al. | 717/133 |
| 7,992,052 B2* | 8/2011 | Moyer et al. | 714/45 |
| 8,024,620 B2* | 9/2011 | Moyer | 717/124 |
| 2004/0019891 A1* | 1/2004 | Koenen | 718/102 |
| 2004/0205410 A1* | 10/2004 | McDonald-Maier et al. | 714/38 |
| 2005/0210454 A1* | 9/2005 | DeWitt et al. | 717/133 |
| 2006/0212244 A1* | 9/2006 | Levine et al. | 702/79 |
| 2006/0230390 A1* | 10/2006 | Alexander et al. | 717/130 |
| 2006/0230391 A1* | 10/2006 | Alexander et al. | 717/130 |
| 2006/0259825 A1* | 11/2006 | Cruickshank et al. | 714/38 |
| 2006/0271919 A1* | 11/2006 | Moyer | 717/136 |
| 2008/0256339 A1* | 10/2008 | Xu et al. | 712/216 |
| 2009/0055153 A1* | 2/2009 | Bell et al. | 703/21 |
| 2009/0083715 A1* | 3/2009 | DeWitt et al. | 717/128 |
| 2009/0100414 A1* | 4/2009 | Dimpsey et al. | 717/127 |
| 2009/0249302 A1* | 10/2009 | Xu et al. | 717/128 |
| 2009/0300295 A1* | 12/2009 | Eccles et al. | 711/154 |

OTHER PUBLICATIONS

Rapid Profiling via Stratified Sampling—S.Subramanya Sastry, Rastislav Bodík, James E. Smith—Computer Sciences Dept. and Dept. of ECE—University of Wisconsin-Madison—2001.*

Using Dynamic Tracing Sampling to Measure Long Running Programs—Jeffrey Odom, Dept.Computer Scienc, University of Maryland—Luiz DeRose, Cray Inc—Kattamuri Ekanadham,IBM—Jeffrey K. Hollingsworth,Dept. of Computer Science,University of Maryland-Simone Sbaraglia,IBM—Proceedings of the 2005 ACM/IEEE SC|05 Conference (SC'05).*

* cited by examiner

TRACE CORRELATION FOR PROFILING SUBROUTINES

BACKGROUND

1. Technical Field

This disclosure relates generally to profiling subroutines executing on a processor, and more specifically, to identifying and correlating trace data associated with executing subroutines.

2. Description of the Related Art

Developers of processors and/or applications usually need to have access to a basic set of development tool functions in order to accomplish their jobs. For run-control, a developer typically needs to query and modify when a processor is halted, showing all locations available in a supervisor map of the processor. Moreover, a developer also usually needs support for breakpoint/watchpoint features in debuggers, either as hardware or software breakpoints depending on the architecture. For logic analysis, a developer usually needs to access instruction trace information. A developer typically needs to be able to interrogate and correlate instruction flow to real-world interactions. A developer also usually needs to retrieve information on how data flows through the system and to understand what system resources are creating and accessing data. Additionally, a developer usually needs to assess whether embedded software is meeting a required performance level.

The Nexus 5001 Forum (formerly known as the global embedded processor debug interface standard consortium (GEPDISC)) was formed to develop an embedded debug/trace interface standard (the "Nexus standard") for embedded control applications. The Nexus standard is particularly applicable to the development of automotive powertrains, data communication equipment, computer peripherals, wireless systems, and other control applications. The Nexus standard provides a specification and guidelines for implementing various messages, e.g., program trace messages (such as branch history messages and synchronization messages), data trace messages, and task/process identification messages (such as ownership trace messages), that may be utilized in debugging applications while minimally impacting operation of a system under development. As defined by the Nexus standard, a program trace message is a message that is provided in response to a change of program flow. According to the Nexus standard, a data trace message is a message that provides visibility of a target processor when a memory write/read reference is detected that matches debug logic data trace attributes. The Nexus standard also defines an ownership trace message (OTM) as a message that provides a macroscopic view of a processor that may be used for task flow reconstruction when debugging software that is written in a high-level language.

BRIEF DESCRIPTION OF THE DRAWINGS

The present disclosure is illustrated by way of example and is not limited by the accompanying figures. Elements in the figures are illustrated for simplicity and clarity and have not necessarily been drawn to scale.

DETAILED DESCRIPTION

Figure 1:
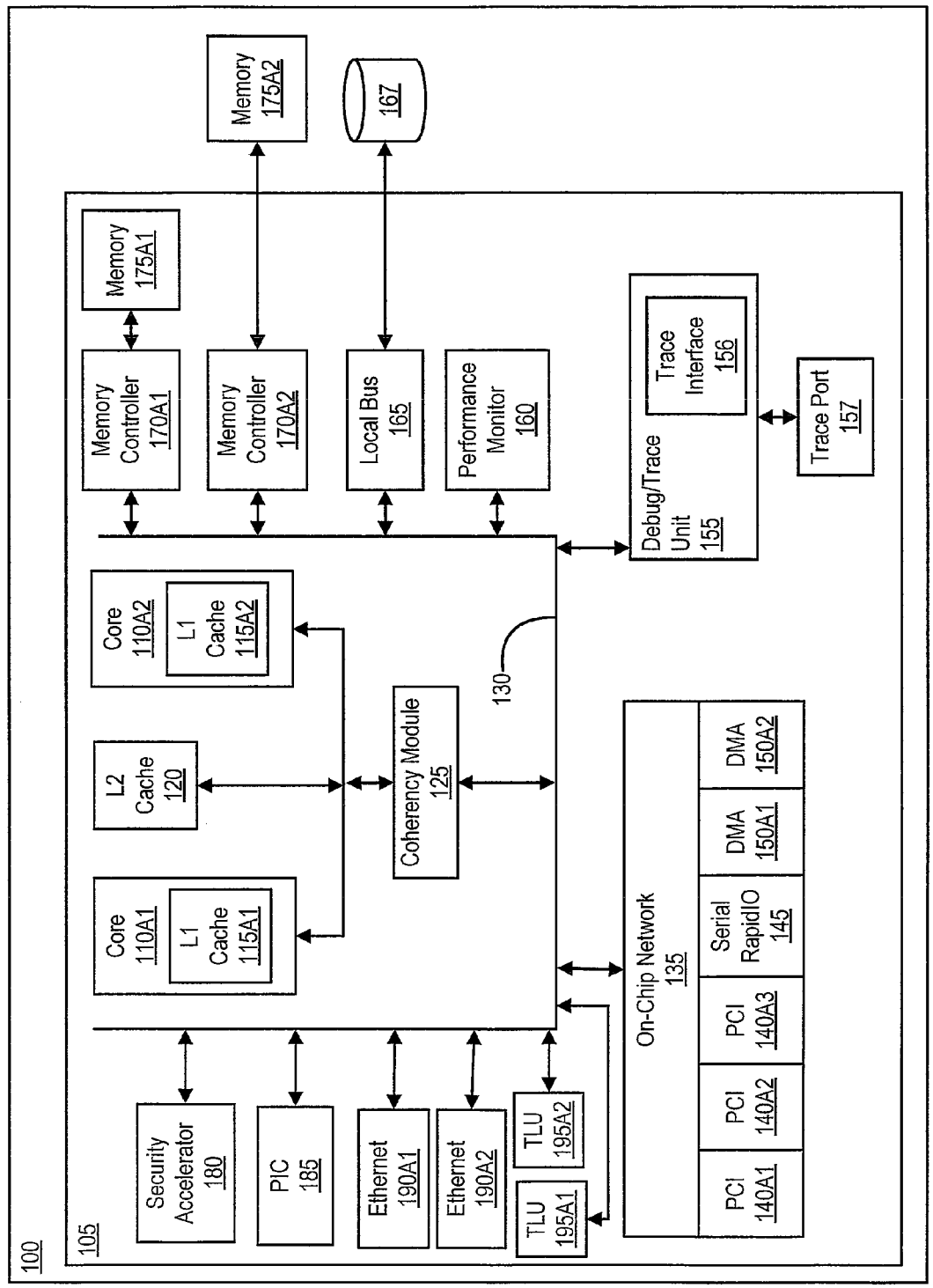
FIG. 1 provides a block diagram of a data processing system configured with a debug/trace unit, according to one or more embodiments.

Turning now to FIG. 1, a block diagram of a data processing system configured with a debug/trace unit is illustrated, according to one or more embodiments. In one or more embodiments, a processor system 100 can include a processing unit 105 (e.g., a chip-level processing unit, an integrated circuit processing unit, a system on chip processing unit, etc.) coupled to a memory 175A2. In one or more embodiments, the term "coupled" can include both direct electrical connection between/among elements and indirect electrical connection between/among elements that is achieved with one or more intervening elements. As illustrated, processing unit 105 can include one or more cores 110A1 and 110A2 that can execute processor instructions of an instruction set architecture (ISA), and cores 110A1 and 110A2 can include first level caches 115A1 and 115A2, respectively. In one or more embodiments, each of caches 115A1 and 115A2 can include separate data and instruction portions or data and instructions can share one or more portions of the cache. Cores 110A1 and 110A2 can be coupled to a second level cache 120 and a coherency module 125. In one or more embodiments, coherency module 125 can provide and/or maintain coherency across local cacheable memory. In one example, coherency module 125 can provide I/O-initiated transactions to snoop the bus between cores 110A1 and 110A2 and/or between either of cores 110A1 and 110A2 and second level cache 120. In a second example, coherency module 125 can provide a flexible switch-type structure that can route and/or dispatch core and I/O initiated transactions to target elements and/or units of processing unit 105. In another example, coherency module 125 can provide a mechanism for any I/O transaction to maintain coherency with a cacheable memory medium, such as memory 175A1 and/or 175A2, and the local bus memory and/or second level cache 120. As illustrated, coherency module 125 can be coupled to a system bus 130.

In one or more embodiments, processing unit 105 can include an on-chip network 135 coupled to system bus 130. On-chip network 135 can include a multi-port, on-chip, non-blocking crossbar switch fabric. In one or more embodiments, the switch fabric serves to decrease contention and increase bandwidth, and the non-blocking crossbar fabric can allow full-duplex port communication with independent per-port transaction queuing and/or flow control.

In one or more embodiments, processing unit 105 can include one or more peripheral component interconnect (PCI) units 140A1-140A3 that can be coupled to on-chip network 135. For example, one or more PCI units 140A1-140A3 can implement a PCI Express interface. For instance, the PCI Express interface can be compliant with a PCI Express Base Specification.

In one or more embodiments, a Serial RapidIO unit 145 can be coupled to on-chip network 135. For example, Serial RapidIO unit 145 can be based on the RapidIO Interconnect Specification, Revision 1.2. RapidIO can include a high-performance, point-to-point, low-pin-count, packet-switched system-level interconnect that can be used in a variety of applications. The RapidIO architecture can provide a variety of features including high data bandwidth, low-latency capability, and support for high-performance I/O devices, as well as providing message-passing and software-managed programming models. Serial RapidIO unit 145 can support multiple inbox/outbox mailboxes (queues) for data and one or more doorbell message structures. Chaining and/or direct modes can be provided for an outbox, and messages can hold multiple packets. In one or more embodiments, Serial RapidIO unit 145 can support I/O and/or message-passing logical specifications, 8-bit and/or 16-bit common transport specifications, and/or the 1x/4x LP-Serial physical layer specification of the RapidIO Interconnect Specification, Revision 1.2.

In one or more embodiments, processing unit 105 can include direct memory access (DMA) engines 150A1 and 150A2 that can be coupled to on-chip network 135. Each of DMA engines 150A1 and 150A2 can be capable of transferring blocks of data from any legal address range to any other legal address range. For instance, DMA 150A1 can perform DMA transfers between any I/O or memory ports or even between two devices or locations on the same port. In one or more embodiments, each of DMA 150A1 and 150A2 can include four-channel DMA controllers. For example, the four-channel DMA controllers can allow chaining (extended and/or direct) through local memory-mapped chain descriptors. In one or more embodiments, misaligned transfers can be supported, and capabilities such as stride transfers and complex transaction chaining can be supported.

In one or more embodiments, processing unit 105 can include a performance monitor 160 coupled to system bus 130. Performance monitor 160 can perform counts of events and processor clocks associated with operations such as cache misses, mispredicted branches, etc. In one or more embodiments, performance monitor 160 can monitor, record, and/or output a number of micro operations (micro-ops) completed, a number of branch instructions completed, a number of load micro-ops completed (e.g., vector instructions and/or cache instructions that operate on multiple pieces of data), a number of store micro-ops completed (e.g., vector instructions and cache instructions that operate on multiple pieces of data), a number of fetch redirects, a number of branches finished, a number of branches taken, a percentage of branches taken, a number of finished unconditional branches that miss in a branch-target buffer, statistics and/or information associated with other branch prediction(s)/misprediction(s), a number of pipeline stalls (and for what cause), a number of memory management unit (MMU) translations, a number of MMU translation misses, a number of load/store accesses, a number of level one cache locks, reloads, and/or cast-outs, a number of cycles load/store unit stalls (and for what reason), snoop statistics (e.g., for coherency impacts), interrupt latencies (e.g., a number of cycles an interrupt is pending before being recognized/serviced), level two cache statistics (e.g., hit/miss/allocate/invalidate), floating point unit (FPU) performance information (e.g., stalls, double pumps, etc.), mark conditions (e.g., instruction address compare matches, data address compare matches, etc.), and/or a number of times a specific instruction executes and/or a specific load/store address accessed, among others. In one or more embodiments, performance monitor 160 can help to identify bottlenecks and can improve system performance by monitoring instruction execution and allowing a trace unit to sample its data. In one or more embodiments, a count of an event can be used to trigger a performance monitor event.

In one or more embodiments, processing unit 105 can include a debug/trace unit 155 that can be coupled to system bus 130. Debug/trace unit 155 can interface with various units of processing unit 105 and can gather information regarding state and/or processing associated with the various units of processing unit 105. For example, debug/trace unit 155 can interface with performance monitor 160 and gather information associated with the various units of processing unit 105. In one or more embodiments, debug/trace unit 155 can perform one or more operations without affecting operation of processing system 105.

As shown, debug/trace unit 155 can include a trace interface 156. In one or more embodiments, trace interface 156 can include a Nexus trace interface. For example, trace interface 156 can be compliant with a Nexus standard (e.g., Nexus 5001). In one or more embodiments, trace interface 156 can form and/or output one or more trace messages. For example, trace interface 156 can form and output messages based on events of performance monitor 160. As illustrated, processing unit 105 can include a trace port 157 coupled to debug/trace unit 155. In one or more embodiments, trace port 157 can be compatible with one or more pin interfaces and/or hardware protocols. In one example, trace port 157 can be compatible with a pin interface and/or hardware protocol of IEEE (Institute of Electrical and Electronics Engineers) 1149.1 or JTAG (Joint Test Action Group). For instance, trace port 157 can be coupled to a JTAG debug unit of a computer system. In another example, trace port 157 can be compatible with a Nexus AUX port. In one or more embodiments, trace interface 156 and/or trace port 157 can provide one or more additional pin interfaces and/or hardware protocols and/or augment one or more existing pin interfaces and/or hardware protocols.

In one or more embodiments, processing unit 105 can include a local bus 165 coupled to system bus 130. Local bus 165 can be coupled to external memories, DSPs, ASICs, etc. As shown, processing system 100 can include non-volatile (NV) storage 167 that can be coupled to processor unit 105 via local bus 165.

In one or more embodiments, processor unit 105 can include one or more peripheral memory controllers 170A1 and 170A2 that can be coupled to system bus 130, and memory controllers 170A1 and 170A2 can be coupled memories 175A1 and 175A2, respectively. As illustrated, memory 175A1 can be included in processing unit 105, and memory 175A2 can be off-part memory of processor system 100. In one or more embodiments, one or more of memories 175A1 and 175A2 can include DDR SDRAM (double-data-rate synchronous dynamic random access memory). Memories 175A1 and 175A2 can be considered memory mediums. The term "memory medium" and/or "computer readable storage medium" can include various types of memory and/or storage. For example, memory medium and/or computer readable storage medium can include an installation medium, e.g., a CD-ROM, DVD-ROM, floppy disks, etc., a random access memory or computer system memory (volatile and/or non-volatile memory) such as DDR SDRAM, DRAM, SRAM, EDO RAM, NVRAM, EPROM, EEPROM, flash memory etc., and/or a non-volatile storage such as a magnetic media, e.g., a hard drive, and/or optical storage. In one or more embodiments, a memory medium and/or computer readable storage medium can include other types of memory and/or storage as well, or combinations thereof. In one or more embodiments, a memory medium and/or computer readable storage medium can be and/or include a product, e.g., a software product, and/or an article of manufacture that includes machine (e.g., processor) executable instructions that implement one or more portions of methods and/or processes described herein.

In one or more embodiments, processing unit 105 can include a security accelerator 180 coupled to system bus 130. Security accelerator 180 can perform security functions, such as key generation and exchange, authentication, and/or bulk encryption from one or more of cores 110A1 and 110A2. In one or more embodiments, security accelerator 180 can implement and/or perform one or more cryptographic algorithms. For example, one or more cryptographic algorithms can include and/or be associated with IPsec (Internet protocol security), IKE (Internet key exchange), SSL/TLS (secure socket layer/transport layer security), iSCSI (Internet small computer system interface), SRTP (secure real-time transport protocol), IEEE 802.11i, A5/3 for GSM (global system for mobile communications) and EDGE (enhanced data rates for GSM evolution), and/or GEA3 for GPRS (general packet radio service), among others.

In one or more embodiments, processing unit 105 can include a programmable interrupt controller (PIC) 185 coupled to system bus 130. For example, PIC 185 can implement logic and/or programming structures of the OpenPIC architecture, providing for external interrupts (with fully nested interrupt delivery), message interrupts, internal-logic driven interrupts, and/or global high-resolution timers. For instance, a number of programmable interrupt priority levels are supported. In one or more embodiments, inter-processor interrupt (IPI) communication can allow one core to interrupt another core or either core to interrupt itself. In one or more embodiments, PIC 185 can be bypassed in favor of an external interrupt controller.

In one or more embodiments, processing unit 105 can include one or more Ethernet controllers/interfaces 190A1 and 190A2 coupled to system bus 130. Each of Ethernet controllers/interfaces 190A1 and 190A2 can include a media access control (MAC) sublayer that can support 10 and 100 Mbps and 1 Gbps Ethernet/IEEE 802.3 networks with MII (Media Independent Interface), RMII (Reduced Media Independent Interface), GMII (Gigabit Media Independent Interface), RGMII (Reduced Gigabit Media Independent Interface), TBI (Ten Bit Interface), and/or RTBI (Reduced Ten Bit Interface) physical interfaces, among others, for example.

In one or more embodiments, processing unit 105 can include one or more table lookup units (TLUs) 195A1 and 195A2 coupled to system bus 130. Each of TLUs 195A1 and 195A2 can support several types of table lookup algorithms and/or provide resources for generation of table entry addresses in memory, hash generation of addresses, and/or binary table searching algorithms for exact-match and/or longest-prefix match strategies. Each table lookup unit (TLU) can allow an implementation of a variety of table lookup algorithms for different applications. Each TLU can include multiple physical tables, where each table can include an associated configuration register including a physical table with a base table address configurable by software.

Figure 2:
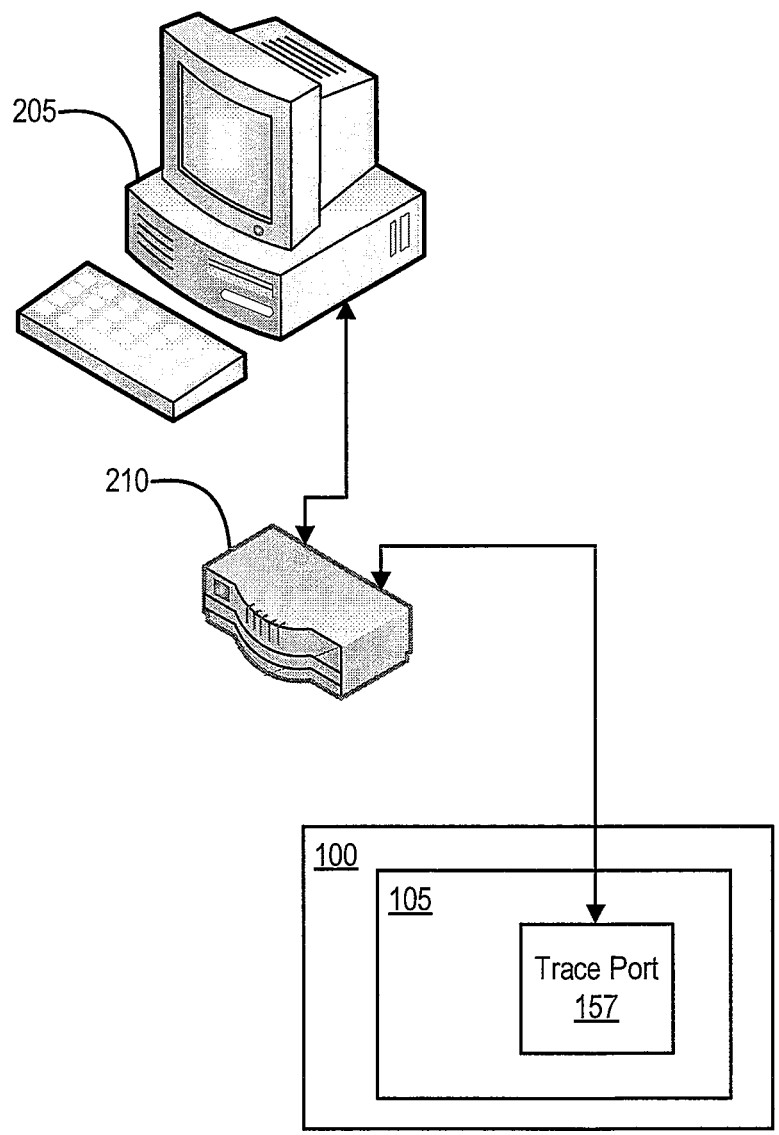
FIG. 2 provides an exemplary trace setup, according to one or more embodiments.

Turning now to FIG. 2, a trace setup is illustrated, according to one or more embodiments. As shown, processing system 100 can be coupled to a debug/trace unit 210, and debug/trace unit 210 can be coupled to a computer system 205. In one or more embodiments, debug/trace unit 210 can receive one or more trace messages formed by trace interface 156, and the trace messages can be conveyed via one or more packets of data through trace port 157 to debug/trace unit 210. In one or more embodiments, debug/trace unit 210 can be external to computer system 205 (as shown), or debug/trace unit 210 can be included in computer system 205 (not shown).

In one or more embodiments, computer system 205 can include a processor (not shown) coupled to a memory medium (not shown), where the processor can execute program instructions from the memory medium to perform various functions, such as interfacing with trace unit 210 and a human being. For example, computer system 205 can include human interface devices such as an output device, e.g., a display, and an input device, e.g., a keyboard. Computer system 205 can include or be coupled to other devices, such as a mouse, one or more speakers, a printer, a track ball, and/or a microphone, among others.

Figure 3:
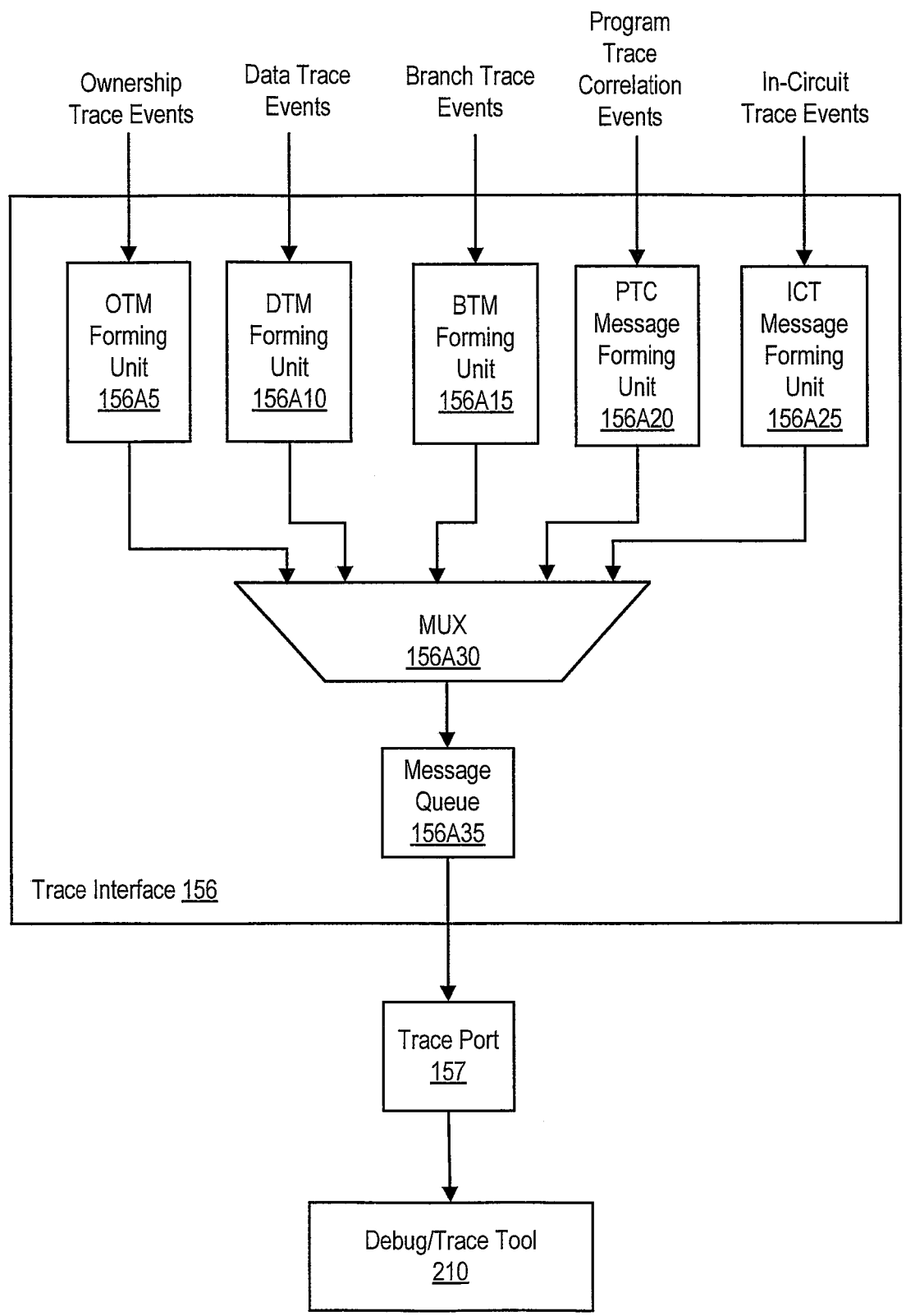
FIG. 3 provides a block diagram that provides further detail of a trace interface, according to one or more embodiments.

Turning now to FIG. 3, a block diagram is illustrated that provides further detail of trace interface 156, according to one or more embodiments. As illustrated, trace interface 156 can include message forming units 156A5-156A25, a multiplexer (MUX) 156A30, and a message queue 156A35. As shown, multiple trace streams can be processed in parallel by trace interface 156, which can form trace messages responsive to trace events. One or more trace message inputs of MUX 156A30 can be selected to provide messages at an output of MUX 156A30. In one or more embodiments, messages provided at the one or more outputs of MUX 156A30 can be provided to message queue 156A35, which can determine whether the messages are to be transmitted in real-time or stored for later transmission. For instance, messages that are to be transmitted to the debug/trace tool 210 can be provided to trace port 157, which is coupled to the debug/trace tool 210.

In one or more embodiments, when an ownership trace event occurs, ownership trace message (OTM) forming unit 156A5 can form an OTM and can provide the OTM to an associated one of the inputs of MUX 156A30. The OTM can be periodically formed or formed in response to a processor identification (PID) register change. In one or more embodiments, the OTM may be useful when employed with embedded processors having memory management units (MMUs). When the OTM is periodically sent, the OTM can include all PIDs defined for a current thread. When the OTM is sent when a PID register changes, the OTM may only include the PID register that changed to reduce bandwidth. To support either scenario, a variable length process field may be implemented in the OTM. The process field may include a PID enumeration (PID_ENUM) section followed by a fixed length PID section. If a PID_ENUM bit of an associated PID is set, then the PID is included in the packet. If the PID_ENUM bit is not set, then the PID is not included in the packet. In one or more embodiments, a four bit PID_ENUM section is provided to support up to four 16-bit PIDs. Similarly, when a data trace event occurs, data trace message (DTM) forming unit 156A10 can form a DTM and can provide the DTM to an associated one of the inputs of MUX 156A30.

In one or more embodiments, when a branch trace event occurs, a branch trace message (BTM) forming unit 156A15 can form a BTM and can provide the BTM to an associated one of the inputs of MUX 156A30. In one example, the BTM can include branch history message (BHM) that identifies a thread switch in a branch type (B-TYPE) field. In another example, the BTM can include a BHM that identifies a return from a subroutine. For instance, the BHM can identify a branch to link instruction (e.g., an indirect branch instruction) that can be used as a return or exit from a subroutine.

In one or more embodiments, when a program trace correlation (PTC) event occurs, a PTC message forming unit 156A20 can form a PTC message and can provide the PTC message to an associated one of the inputs of MUX 156A30. In one or more embodiments, an event code (EVCODE) field of the PTC message can be formed in response to an event that indicated that a branch and link instruction is detected. For instance, debug/trace unit 155 may detect the branch and link instruction. In one or more embodiments, an EVCODE field of the PTC message can identify a branch and link event that can be used to identify a call to a subroutine. For example, the PTC message can debug/trace tool 210 and/or computer system 205 to correlate watchpoint or performance events to a program trace of an associated subroutine. As shown in Table 1, the PTC message can include the EVCODE field that can be modified to indicate one or more events, such as a thread switch, a branch and link event, etc. Other packets of the PTC message are described in Table 1, as well.

In one or more embodiments, an EVCODE field of the PTC message can identify a thread switch. The PTC message allows debug/trace tool 210 and/or computer system 205 to, for example, correlate watchpoint or performance events to a program trace of an associated thread.

TABLE 1

| Minimum Packet Size (bits) | Packet Name | Packet Type | Description |
| --- | --- | --- | --- |
| 0 | TSTAMP | Vendor-variable | Number of cycles message was held in the buffer or the full timestamp value. |
| 0 | CDATA | Vendor-variable | This packet is a vendor-defined field. It can represent a value used in correlating an event with program flow (e.g., branch history). |
| 1 | I-CNT | Variable | Number of instruction units executed since the last taken branch. |
| 0 | EVCODE | Vendor-fixed | Event Code. Refer to Table 2. |
| 0 | SRC | Vendor-fixed | Client that is source of message. |
| 6 | TCODE | Fixed | Value = 33 |

As shown in Table 2 below, EVCODE of the PTC message can indicate various events. In one or more embodiments, the EVCODE of the PTC message can indicate that a branch occurred in one of cores 110A1 and 110A2. In one example, the EVCODE of the PTC message can indicate that a branch and link instruction occurred in one of cores 110A1 and 110A2, and the PTC message can include 1010 as EVCODE to indicate that the branch and link instruction occurred in one of cores 110A1 and 110A2. In a second example, the EVCODE of the PTC message can indicate that a direct branch instruction occurred in one of cores 110A1 and 110A2, and the PTC message can include 1101 as EVCODE to indicate that the direct branch instruction occurred in one of cores 110A1 and 110A2. In another example, the EVCODE of the PTC message can indicate that a branch to link instruction occurred in one of cores 110A1 and 110A2, and the PTC message can include 1100 as EVCODE to indicate that the branch to link instruction occurred in one of cores 110A1 and 110A2.

TABLE 2

| Event Code (EVCODE) | Event Description |
| --- | --- |
| 0000 | Entry into debug mode |
| 0001 | Entry into low-power mode |
| 0010 | Data Trace - Write |
| 0011 | Data Trace - Read |
| 0100 | Program Trace Disabled |
| 0101-0111 | Reserved for future functionality |
| 1010 | Branch and Link Occurrence |
| 1011 | Thread Switch |
| 1100 | Branch to Link Occurence |
| 1101 | Direct Branch Occurrence |

In one or more embodiments, each of the trace events can provide an associated thread identification (ID) and a core ID (if applicable) to an appropriate message forming unit. In one or more embodiments, a thread and a core ID can be concatenated in a single source (SRC) field of a message. In one or more embodiments, when an in-circuit trace (ICT) event occurs, ICT message forming unit 156A25 can form an ICT message and can provide the ICT message an associated one of the inputs of MUX 156A30. The ICT message can be formed responsive to an inter-thread communication or a shared memory access, among others. An in-circuit event that corresponds to, for example, a core register access, a key circuit debug signal, a watchpoint event, or a performance event can be reported in the ICT message. In one or more embodiments, other events and messages (e.g., Nexus events and messages) not specifically described herein may be referred to as ICT events and messages, and ICT forming unit 156A30 can responds to these events and form messages that correspond to those events.

Figure 4:
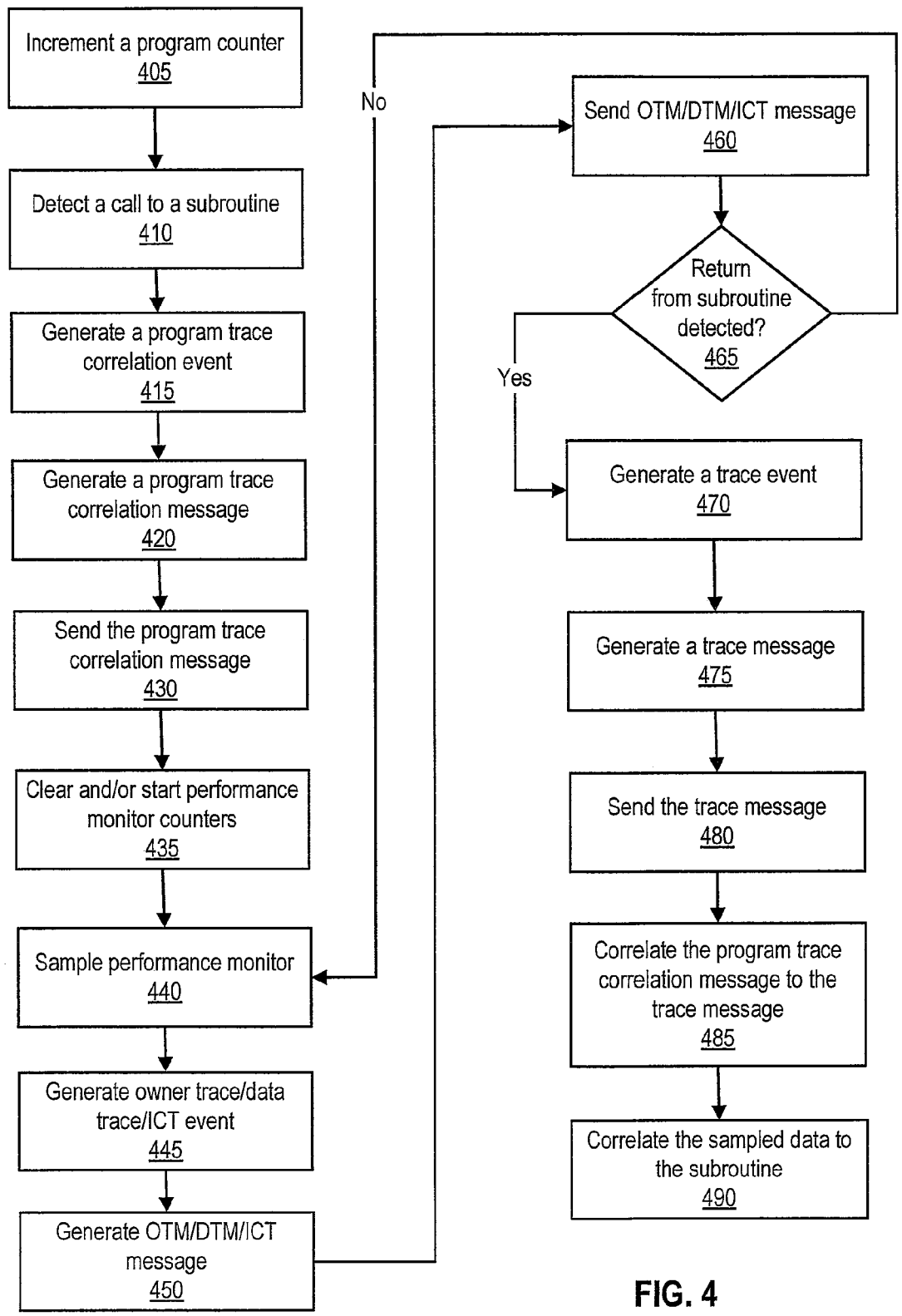
FIG. 4 is a flowchart diagram of a method, according to one or more embodiments.

Turning now to FIG. 4, a method is illustrated, according to one or more embodiments. At 405, a program counter can be incremented. For example, a set of program instructions can be executing on core 110A1, and the program counter can be incremented to the next instruction in the set of program instructions. At 410, a call to a subroutine can be detected. In one or more embodiments, a subroutine can include a sequence of machine executable instructions that is invoked by a call to the subroutine. For example, the subroutine can be used in one or more computer programs and/or at one or more points in a computer program. For instance, the subroutine can be used at two or more points in a computer program such that the instructions of the subroutine are not repeated in the computer program but the instructions of the subroutine can be executed at least two times, e.g., one time for each point of invocation from the computer program. Other terms for subroutine can include routine, function, and/or procedure, among others.

In one example, debug/trace unit 155 can detect the call to the subroutine. In another example, performance monitor 160 can detect the call to the subroutine. In one instance, debug/trace unit 155 can detect the call to the subroutine using performance monitor 160 to detect the call to the subroutine. In one or more embodiments, the call to the subroutine can be detected by a comparison that includes: an instruction being executed, an instruction pointed to by the program counter, an instruction in a decode unit, an instruction in a cache, or an instruction in an issue queue, among others. For example, the call to the subroutine can be detected by an opcode of the instruction. In one or more embodiments, a branch instruction can include the call to the subroutine. In one or more instances, the branch instruction can be a conditional branch instruction or a branch-always instruction. In one or more embodiments, the branch instruction can include a specific branch instruction. For example, the subroutine call can be detected by a comparison that identifies a branch and link instruction. For instance, the branch and link instruction can be a direct branch instruction, where an address of the subroutine is relative to the program counter. In one or more embodiments, detecting the subroutine call can trigger a PTC event.

At 415, a first PTC event can be generated, and at 420, a first PTC message can be generated. For example, the first PTC message can indicate and/or identify the call to the subroutine. For instance, the first PTC message can be used to correlate the call to the subroutine with a later return from the subroutine. At 430, the first PTC message can be sent. In one or more embodiments, the first PTC message can be sent to message queue 156A35, and message queue 156A35 can queue the first PTC message and send the first PTC message later to debug/trace tool 210 via trace port 157, or queue 156A35 can send the first PTC message to debug/trace tool 210 via trace port 157. For instance, queue 156A35 can send the first PTC message to debug/trace tool 210 via trace port 157 in real-time.

At 435, one or more performance monitors and/or counters can be cleared and/or started. In one or more embodiments, the one or more performance monitors and/or counters can include one or more monitors and/or counters described above with reference to performance monitor 160. At 440, system performance and/or counters can be sampled. In one or more embodiments, information that performance monitor 160 samples, measures, and/or records can be sampled. At 445, an ownership trace, data trace, or ICT event can be generated. In one or more embodiments, the ownership trace, data trace, or ICT event can be generated in response to a change in a monitor or counter. At 450, an OTM, DTM, or ICT message can be generated. In one or more embodiments, the OTM, DTM, or ICT message can be generated in response to the ownership trace, data trace, or ICT event. At 460, the OTM, DTM, or ICT message can be sent. In one or more embodiments, the OTM, DTM, or ICT message can be sent to message queue 156A35, and message queue 156A35 can queue the OTM, DTM, or ICT message and send the OTM, DTM, or ICT message later to debug/trace tool 210 via trace port 157, or message queue 156A35 can send the OTM, DTM, or ICT message to debug/trace tool 210 via trace port 157. For instance, message queue 156A35 can send the OTM, DTM, or ICT message to debug/trace tool 210 via trace port 157 in real-time.

At 465, it can be determined whether or not a return from a subroutine is detected. In one example, debug/trace unit 155 can detect the return from the subroutine. In another example, performance monitor 160 can detect the return from the subroutine. In one instance, debug/trace unit 155 can detect the return from the subroutine using performance monitor 160 to detect the return from the subroutine. In one or more embodiments, the return from the subroutine can be detected by a comparison that includes: an instruction being executed, an instruction pointed to by the instruction counter, an instruction in a decode unit, an instruction in a cache, or an instruction in an issue queue, among others. For example, the return from the subroutine can be detected by an opcode of the instruction. In one or more embodiments, a branch instruction can include the return from the subroutine. In one or more instances, the branch instruction can be a conditional branch instruction or a branch-always instruction. In one or more embodiments, the branch instruction can include a specific branch instruction. In one example, the return from the subroutine can be detected by a comparison that identifies a branch to link instruction. For instance, the branch to link instruction can be an indirect branch instruction, where an address target of the branch is stored in a register of a core (e.g., a link register). In another example, the return from the subroutine can be detected by a comparison that identifies a direct branch instruction. In one or more embodiments, the instruction can include a hint, where the hint can indicate whether or not the instruction (e.g., a branch instruction) is a return from a subroutine, and the hint can be used in determining whether or not a return from a subroutine is detected. If a return from the subroutine is not detected, the method can proceed to 440. If a return from the subroutine is detected, the method can proceed to 470. In one or more embodiments, detecting the return from the subroutine call can trigger a trace event. In one example, detecting the return from the subroutine call can trigger a branch trace event. In another example, detecting the return from the subroutine call can trigger a PTC event.

At 470, a trace event is generated, and at 475, a trace message is generated. In one or more embodiments, the trace event can include a branch history event or a second PTC event, and a respective BHM or second PTC message can be generated. At 480, the trace message can be sent to message queue 156A35, and message queue 156A35 can queue the trace message and send the trace message later to debug/trace tool 210 via trace port 157, or message queue 156A35 can send the trace message to debug/trace tool 210 via trace port 157. For instance, message queue 156A35 can send the trace message to debug/trace tool 210 via trace port 157 in real-time.

At 485, the first PTC message and the trace message can be correlated. In one or more embodiments, the first PTC message and the trace message can be used to determine a boundary for the subroutine. For example, the boundary can be used to correlate data sampled during an execution of the subroutine to the execution of the subroutine. In one or more embodiments, a time-stamp of the first PTC message and a time-stamp of the trace message can be used to correlate the first PTC message and the trace message.

At 490, sampled data monitored during execution of the subroutine can be correlated using the first PTC message and the trace message. In one or more embodiments, a time-stamp of the first PTC message and a time-stamp of the trace message can be used to correlate sampled data monitored during execution of the subroutine. In one or more embodiments, the first PTC message may not include a time-stamp, and an order of trace messages sent at 460, relative to the first PTC message, can indicate a time relationship of the sampled data relative to the subroutine call. In one example, debug/trace tool 210 can correlate the sampled data monitored during execution of the subroutine. In another example, computer system 205 can correlate the sampled data monitored during execution of the subroutine.

In one or more embodiments, one or more portions of the method illustrated in FIG. 4 can be non-intrusively utilized to debug and/or profile software and/or one or more processors, processing units, processor systems, cores, etc. In one example, at least one or more of 410-485 does not affect an execution of the subroutine. In another example, at least one or more of 410-485 does not affect an execution of a set of executable instructions (e.g., instructions of the ISA) that calls the subroutine. In one or more embodiments, the set of executable instructions that calls the subroutine can include the subroutine, which the subroutine includes a set of executable instructions (e.g., instructions of the ISA). For example, the set of executable instructions of the subroutine can be a proper subset of the set of executable instructions that calls the subroutine.

It is noted that, in one or more embodiments, one or more of the method elements described herein and/or one or more portions of an implementation of a method element may be performed in varying orders, may be performed concurrently with one or more of the other method elements and/or one or more portions of an implementation of a method element, or may be omitted. Additional method elements can be performed as desired. In one or more embodiments, concurrently can mean simultaneously. In one or more embodiments, concurrently can mean apparently simultaneously according to some metric. For example, two or more method elements and/or two or more portions of an implementation of a method element can be performed such that they appear to be simultaneous to a human. It is noted that, in one or more embodiments, one or more of the method elements described herein and/or one or more portions of an implementation of a method element can be implemented using logic implemented in hardware (e.g., one or more integrated circuits). In one example, one or more of the method elements described herein and/or one or more portions of an implementation of a method element can be implemented using one or more state machines implemented using logic implemented in hardware. It is also noted that, in one or more embodiments, one or more of the system elements described herein can be omitted and additional system elements can be added as desired.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method, comprising:
   detecting a call to a subroutine via at least one comparison of at least one instruction;
   in response to said detecting the call to the subroutine, generating a program trace correlation message;
   sending the program trace correlation message to a trace port;
   sampling data associated with an execution of the subroutine;
   starting at least one performance monitor;
   generating at least one of an ownership trace message and an in-circuit trace message; and
   sending the at least one of the ownership trace message and the in-circuit trace message to the trace port;
   wherein said sampling the data associated with the execution of the subroutine includes sampling the at least one performance monitor;
   sending the sampled data to the trace port;
   detecting a return from the subroutine;
   in response to said detecting the return from the subroutine, generating a trace message; sending the trace message to the trace port; and
   correlating the sampled data to the subroutine using a boundary for the subroutine determined from the program trace correlation message and the trace message;
   wherein the execution of the subroutine is not interrupted by at least said sampling the data, said sending the sampled data, said detecting the return from the subroutine, and said correlating the sampled data.

2. The method of claim 1,
   wherein the program trace correlation message is a first program trace correlation message; and
   wherein the trace message is a second program trace correlation message.

3. The method of claim 1, wherein the trace message is a branch history message.

4. The method of claim 1, further comprising:
   executing a plurality of instructions that includes the call to the subroutine;
   wherein said executing the plurality of instructions is not affected by at least said detecting the call to the subroutine, said generating the program trace correlation message, said sending the program trace correlation message, said sampling the data, said sending the sampled data, said detecting the return from the subroutine, said generating the trace message, said sending the trace message, and said correlating the sampled data.

5. The method of claim 1, further comprising:
   executing the subroutine;
   wherein said executing the subroutine is not affected by at least said detecting the call to a subroutine, said generating the program trace correlation message, said sending the program trace correlation message to the trace port, said sending the trace message, and said correlating the sampled data.

6. The method of claim 1, wherein the trace port includes at least one or a NEXUS trace port and an IEEE 1149.1 port.

7. The method of claim 1, wherein said detecting the return from the subroutine includes detecting an indirect branch instruction.

8. The method of claim 7,
   wherein the call to the subroutine includes a branch and link instruction, wherein an address of the subroutine is relative to a program counter; and
   wherein the indirect branch instruction includes a branch to link instruction.

9. A system, comprising:
   at least one core configured to execute instructions of an instruction set architecture (ISA); and
   a first trace unit coupled to the at least one core, wherein the trace unit is configured to:
      detect a call to a subroutine via at least one comparison of at least one instruction, wherein the call to the subroutine includes a branch and link instruction of the ISA, wherein an address of the subroutine is relative to a program counter of the at least one core;
      in response to said detecting the call to the subroutine, generate a program trace correlation message;
      send the program trace correlation message to a trace port;
      sample data associated with an execution of the subroutine;
      start at least one performance monitor;
      sample the at least one performance monitor when the trace unit samples data associated with the execution of the subroutine;
      generate at least one of an ownership trace message and an in-circuit trace message; and
      send the at least one of the ownership trace message and the in-circuit trace message to the trace port;
      send the sampled data to the trace port;
      detect a return from the subroutine;
      in response to said detecting the return from the subroutine, generate a branch history message; and
      send the branch history message to the trace port; and
      correlate the sampled data to the subroutine using a boundary for the subroutine determined from the program trace correlation message and the branch history message;
      wherein the execution of the subroutine is not interrupted by at least said sampling the data, said sending the sampled data to the trace port, and said detecting the return from the subroutine.

10. The system of claim 9, further comprising:
    an integrated circuit, wherein the integrated circuit includes the at least one core and the first trace unit.

11. The system of claim 9, wherein the at least one core is configured to:

execute a plurality of instructions of the ISA that includes the call to the subroutine;

wherein said executing the plurality of instructions of the ISA is not affected by at least said detecting the call to the subroutine, said generating the program trace correlation message, said sending the program trace correlation message to the trace port, said sampling the data, said sending the sampled data, said detecting the return from the subroutine, said generating the branch history message, and said sending the branch history message.

12. The system of claim 11, wherein the subroutine includes a plurality of instructions of the ISA, and wherein the plurality of instructions of the subroutine is a proper subset of the plurality of instructions that includes the call to the subroutine.

13. The system of claim 9, wherein said detecting the return from the subroutine includes detecting a branch to link instruction of the ISA.

14. A non-transitory computer readable storage medium comprising instructions, which when executed on a processing system, cause the processing system to perform:
detecting a call to a subroutine via at least one comparison of at least one instruction;
in response to said detecting the call to the subroutine, generating a program trace correlation message;
sending the program trace correlation message to a trace port;
sampling data associated with an execution of the subroutine;
starting at least one performance monitor;
generating at least one of an ownership trace message and an in-circuit trace message; and
sending the at least one of the ownership trace message and the in-circuit trace message to the trace port;
wherein said sampling the data associated with the execution of the subroutine includes sampling the at least one performance monitor;
sending the sampled data to the trace port;
detecting a return from the subroutine;
in response to said detecting the return from the subroutine, generating a trace message;
sending the trace message to the trace port; and
correlating the sampled data to the subroutine using a boundary for the subroutine determined from the program trace correlation message and the trace message;
wherein the execution of the subroutine is not interrupted by at least said sampling the data, said sending the sampled data, said detecting the return from the subroutine, said generating the trace message, said sending the trace message, and said correlating the sampled data.

15. The computer readable storage medium of claim 14, wherein the program trace correlation message is a first program trace correlation message; and
wherein the trace message is a second program trace correlation message.

16. The computer readable storage medium of claim 14, wherein the trace message is a branch history message.

17. The computer readable storage medium of claim 14, wherein the call to the subroutine includes a branch and link instruction, wherein an address of the function is relative to a program counter; and
wherein said detecting the return from the subroutine includes detecting a branch to link instruction.

* * * * *